Figure 3:
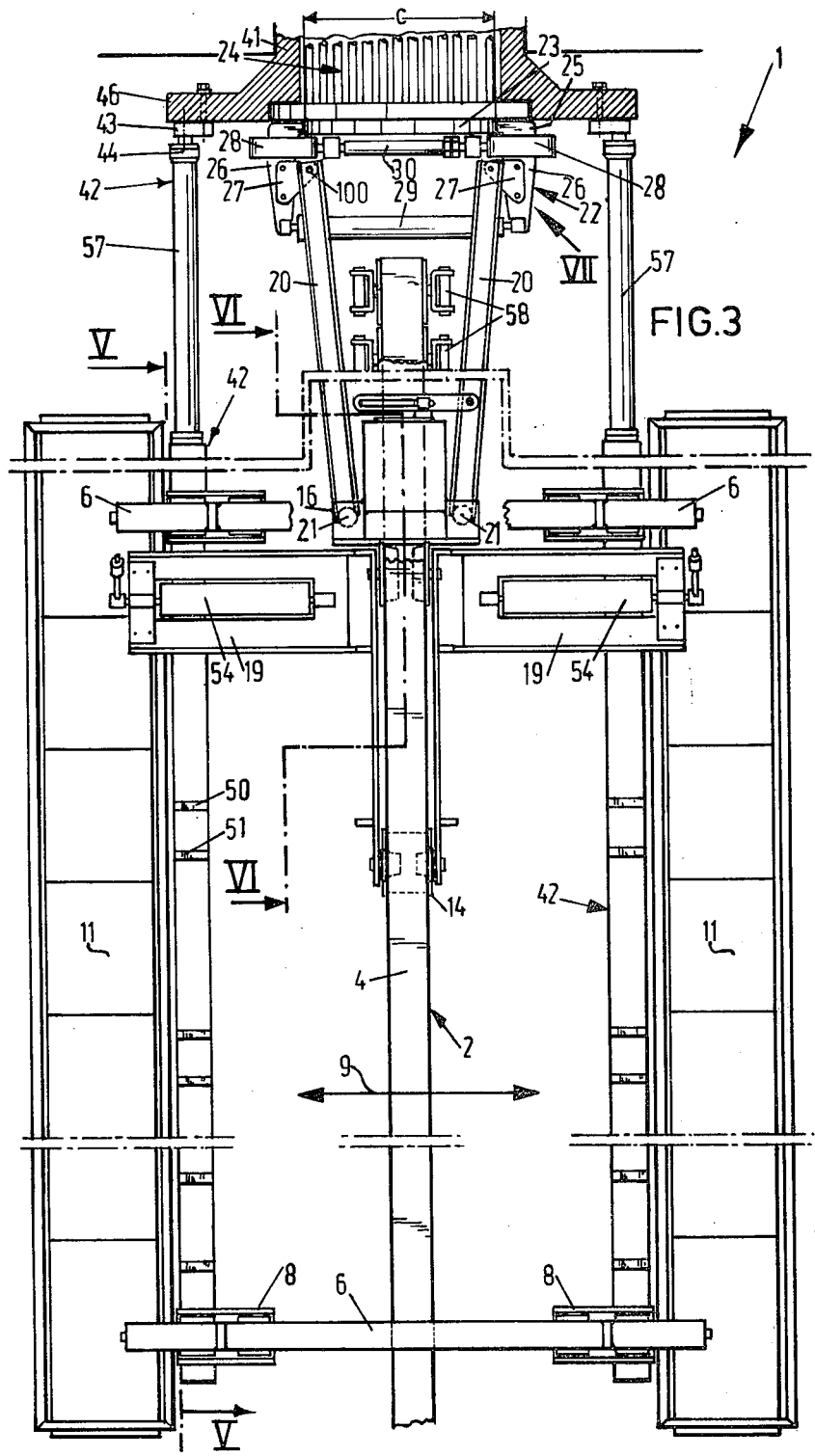

United States Patent [19]
van der Woerd

[11] 3,954,187
[45] May 4, 1976

[54] PIPE BUNDLE KEY

[75] Inventor: Barend van der Woerd, Muiderberg, Netherlands

[73] Assignee: N.V. Machinefabriek Stork-Jaffa, Utrecht, Netherlands

[22] Filed: May 15, 1974

[21] Appl. No.: 470,119

[30] Foreign Application Priority Data
May 21, 1973 Netherlands............... 7307083

[52] U.S. Cl............... 214/1 P; 29/202 R; 212/5; 214/16.4 R; 214/394
[51] Int. Cl.² ......................... B66F 1/00
[58] Field of Search ........... 214/1 P, 87, 16.4 R, 214/394; 29/202 R; 212/5, 13, 14

[56] References Cited
UNITED STATES PATENTS

| | | | |
|---|---|---|---|
| 2,113,712 | 4/1938 | Robinson | 214/87 X |
| 2,213,774 | 9/1940 | Taylor | 214/309 |
| 3,126,103 | 3/1964 | Postlewaite | 214/1 P |
| 3,257,001 | 6/1966 | Postlewaite | 214/1 P |
| 3,510,012 | 5/1970 | Meteren | 214/1 P |
| 3,567,044 | 3/1971 | Travis | 214/1 P |
| 3,836,015 | 9/1974 | Travis | 214/1 P |

Primary Examiner—Robert J. Spar
Assistant Examiner—George F. Abraham
Attorney, Agent, or Firm—Snyder, Brown & Ramik

[57] ABSTRACT

For withdrawing a bundle of pipes from a heat exchanger and for inserting such bundle the required tractive forces should be exerted on the bundle in a direction in line therewith by means of a key. In order to avoid drawing the jacket of the heat exchanger from its supporting frame and to avoid deformation of said frame the bundle is engaged by a gripper arranged on a main frame suspended to a carriage provided with telescopic carrier legs.

21 Claims, 15 Drawing Figures

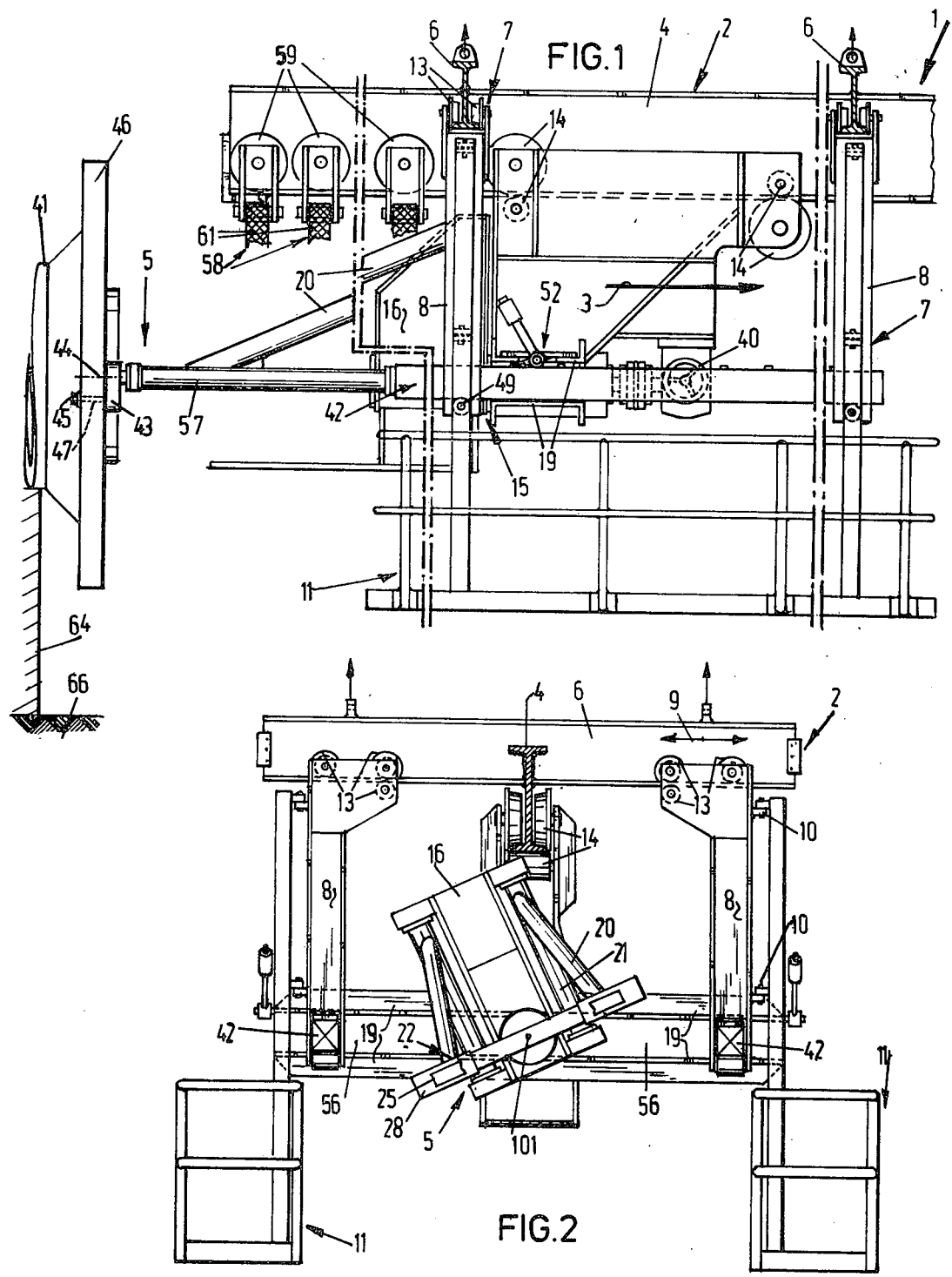

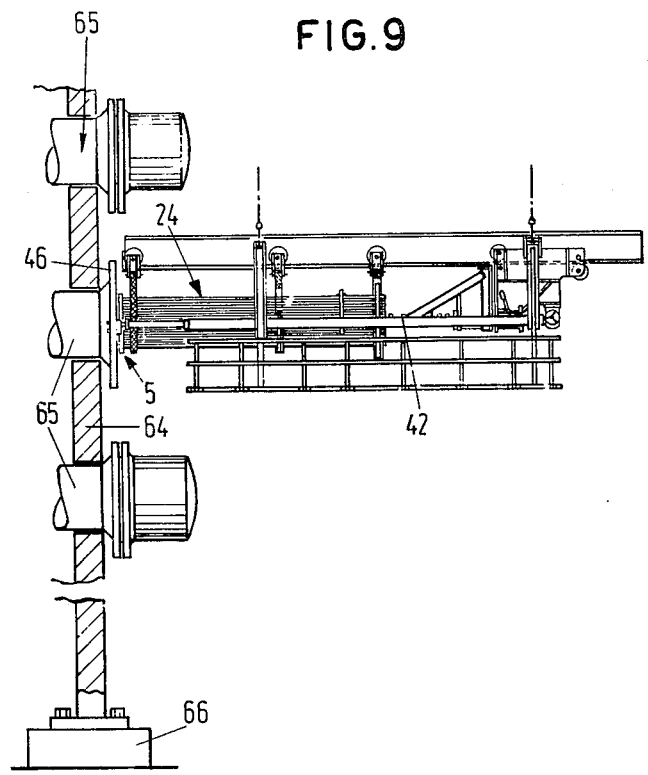

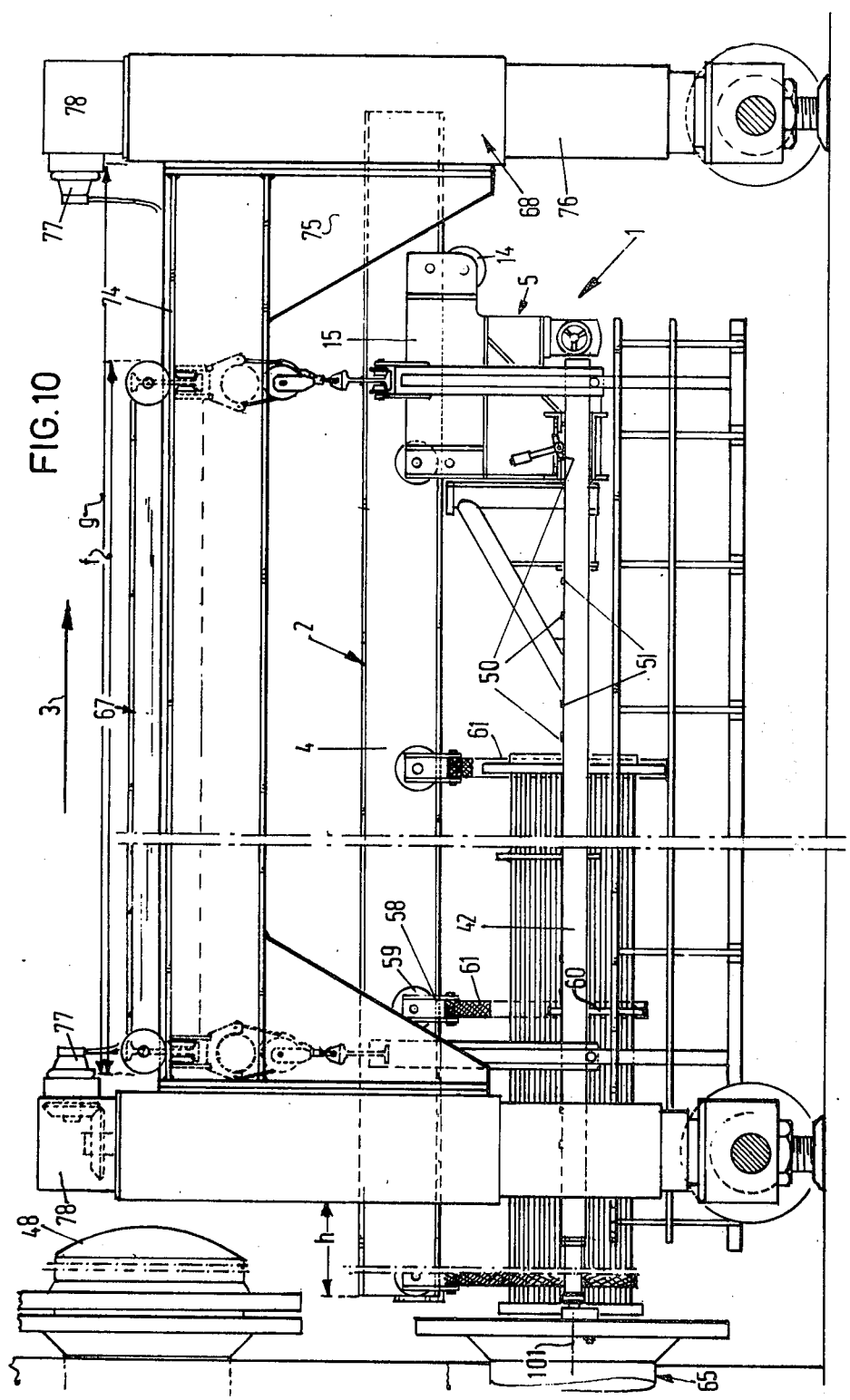

PIPE BUNDLE KEY

A heat exchanger mainly comprising a bundle of pipes and a jacket surrounding said bundle of pipes and having two head covers has to be cleaned occasionally. For this purpose the bundle of pipes is drawn out of the jacket by means of a pipe bundle key and inserted back into it after cleaning.

The invention relates to a pipe bundle key comprising a gripper capable of engaging the bundle of pipes and pulling means adapted to be coupled with said gripper and to be moved in the direction of pull on the bundle of pipes.

Whilst the bundle of pipes is being withdrawn from the jacket with the aid of the pulling means, the bundle of pipes is supported over its length protruding from the jacket from a number, for example, two or three conventional hoisting cranes. When a bundle of pipes is withdrawn from the jacket, the tractive forces exerted on the bundle are frequently directed at an angle to the direction of length of the bundle instead of being directed accurately coaxially so that the disengagement of the bundle of pipes requires a heavy pulling force. These heavy pulling forces are exerted not only on the bundle of pipes but indirectly also on the jacket so that the risk of drawing the jacket from its frame or of said frame being pulled out of alignment is involved.

The invention provides a pipe bundle key which is improved in this respect and which is characterized in that the gripper is arranged on a main frame suspended to a carriage provided with telescopic carrier legs. Since by means of this pipe bundle key the tractive force can be readily exerted in the coaxial direction when the bundle is drawn out, disengagement of the bundle of pipes is facilitated.

The aforesaid and further features of the invention will be described more fully in the following description of a pipe bundle key embodying the invention with reference to the drawing.

IN THE DRAWING

Figure 4:
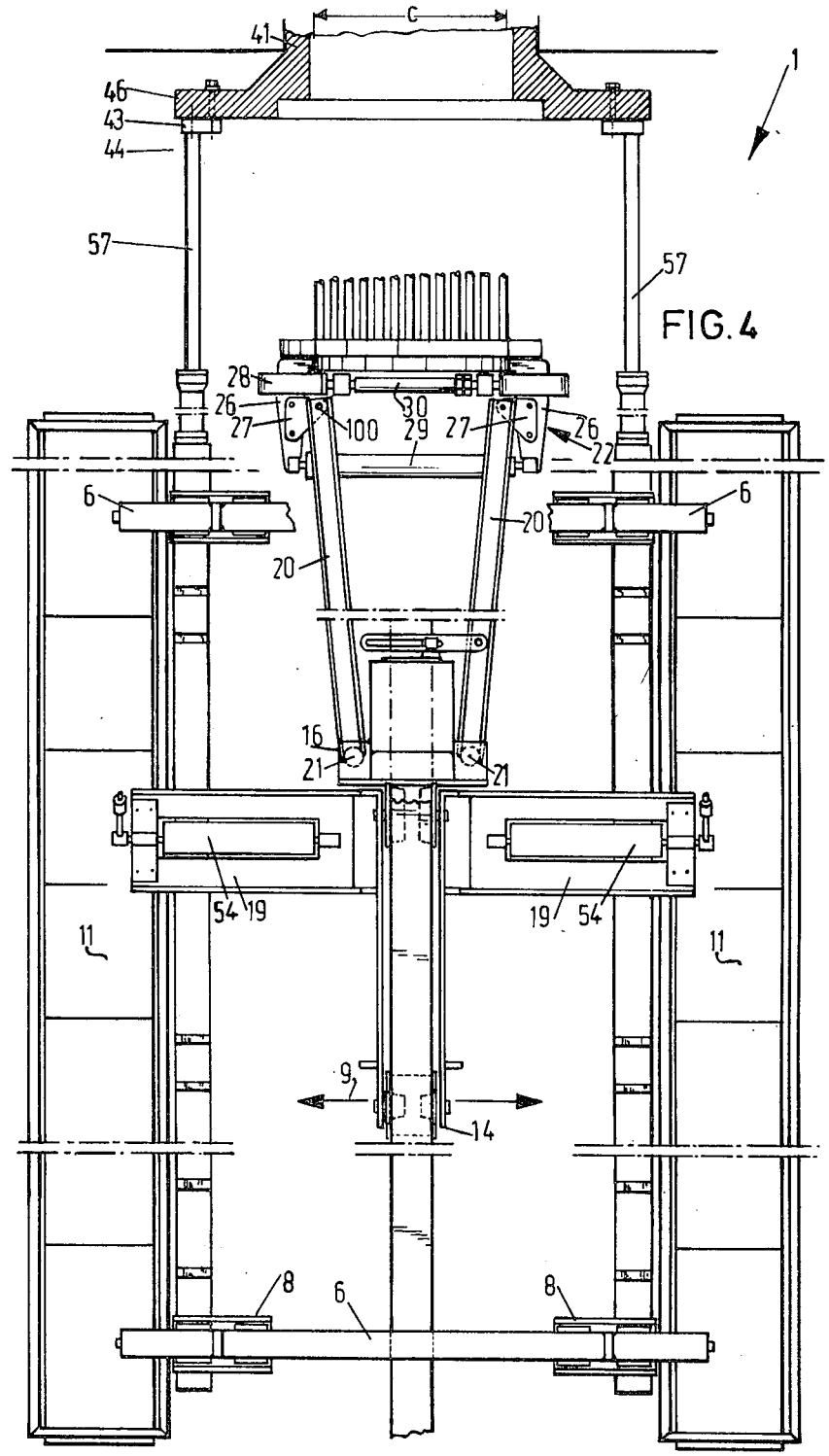
Figure 6:
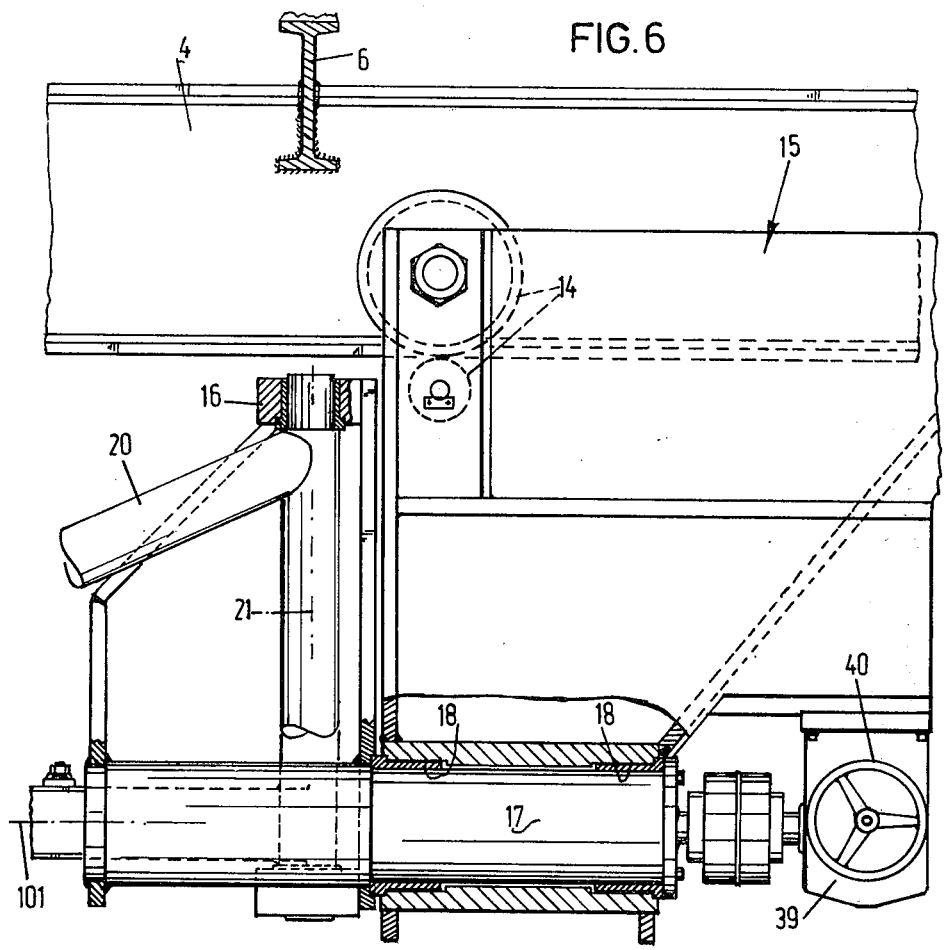
Figure 5:
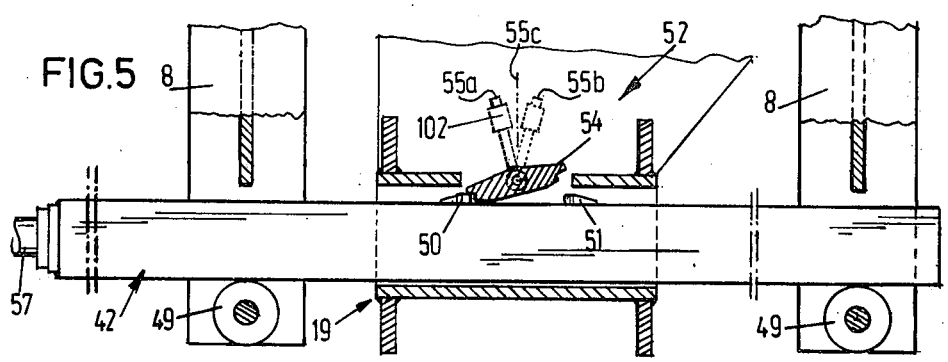
Figure 7:
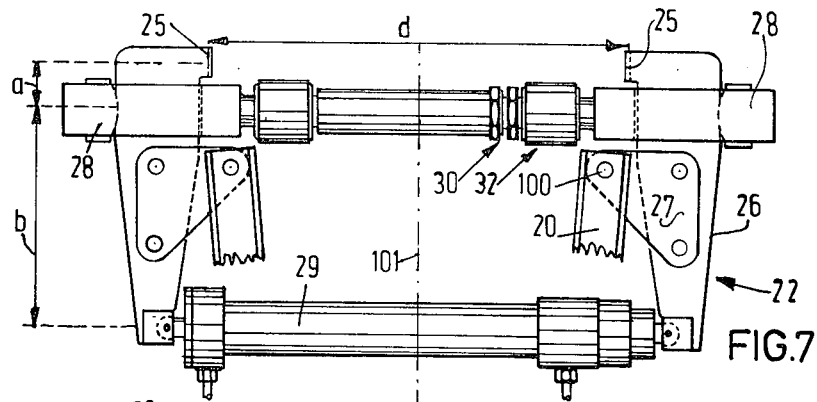
Figure 8:
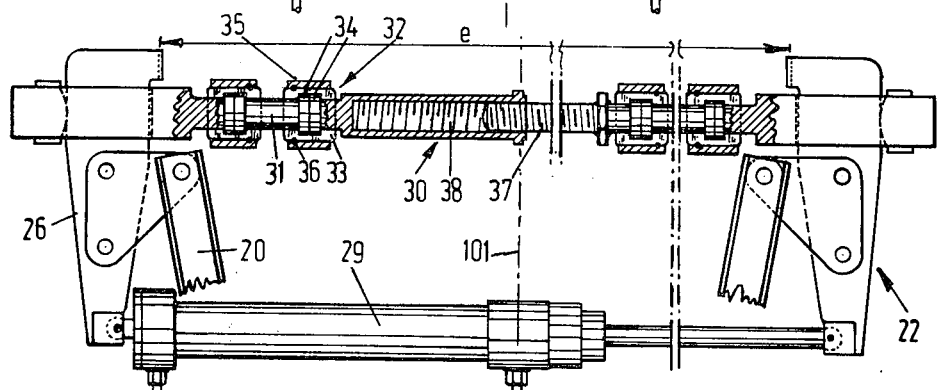
Figure 15:
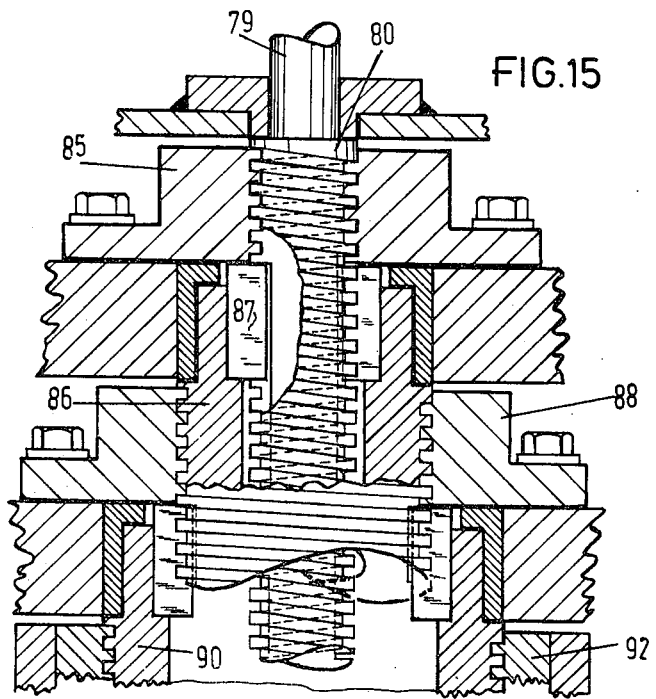
Figure 11:
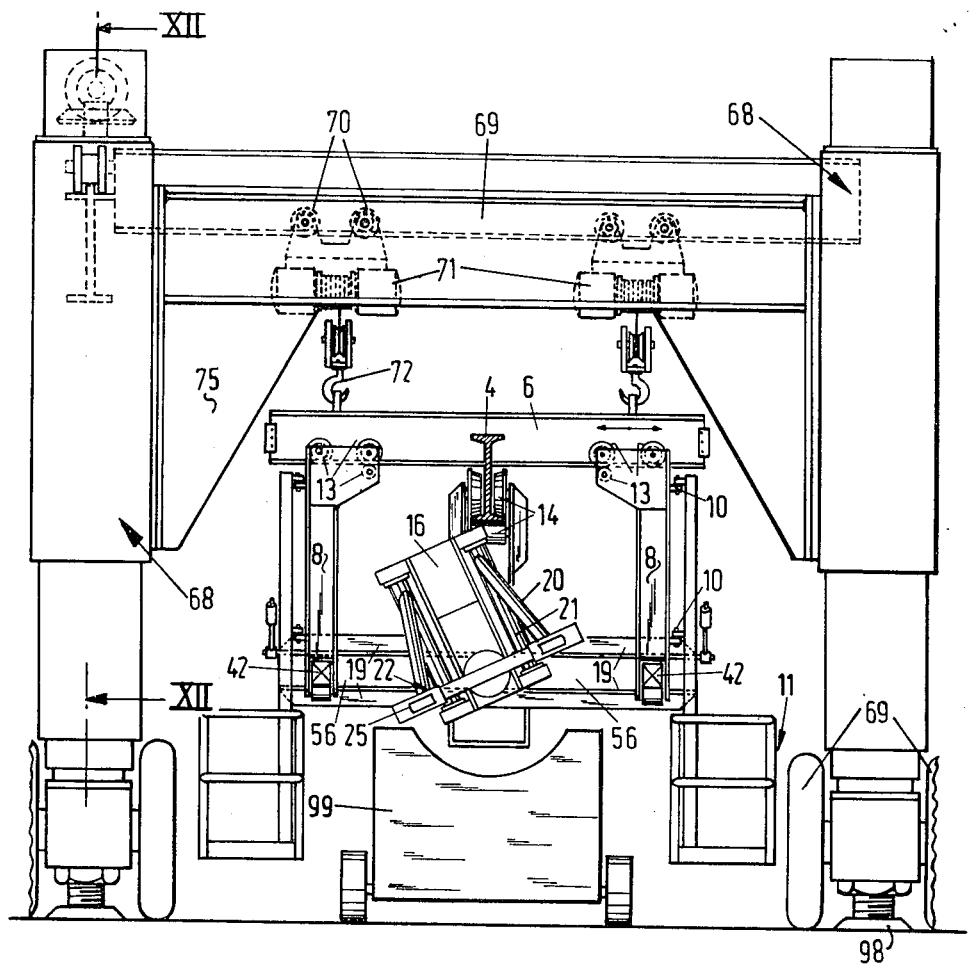
Figure 12:
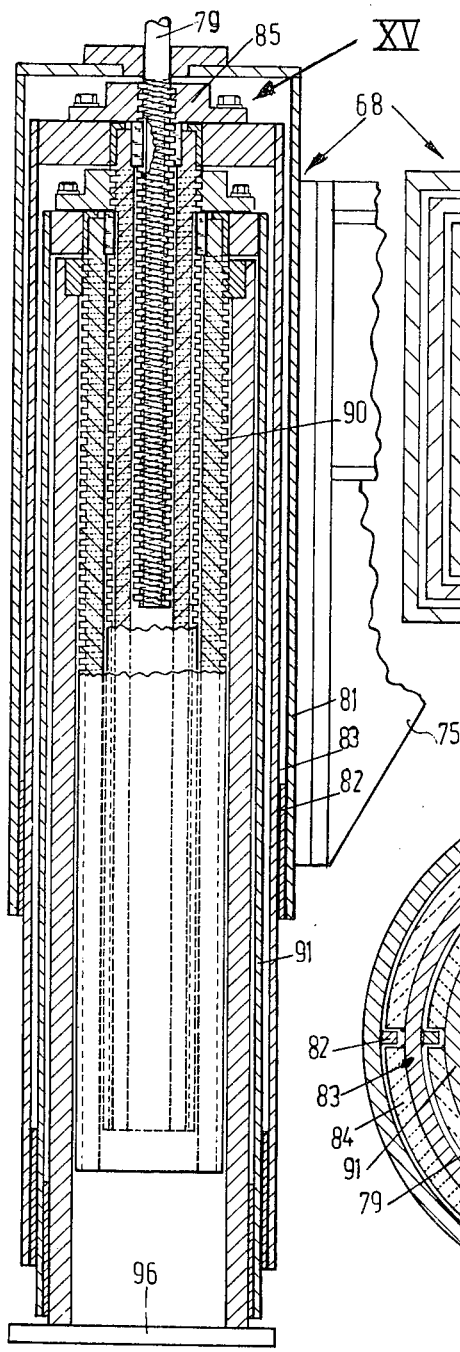
Figure 14:
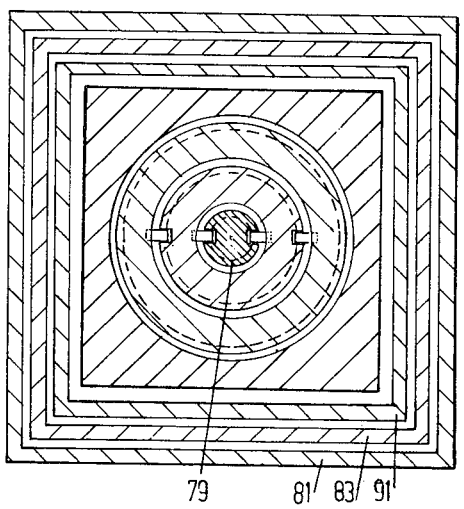
Figure 13:
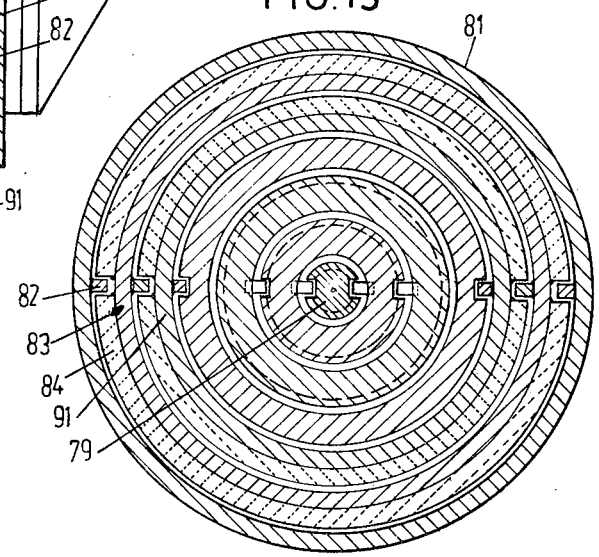

FIGS. 1, 2 and 3 are a side-, front- and a plan view respectively of a preferred embodiment of the device in accordance with the invention, FIG. 4 is a plan view like that of FIG. 3 in a further stage of the widthdrawal of a bundle of pipes, FIGS. 5 and 6 are enlarged sectional views taken on the lines V-V and VI—VI respectively in FIG. 3, FIG. 7 shows on an enlarged scale a detail VII in FIG. 3, relating to the gripper, FIG. 8 shows a detail like FIG. 7 relating to the gripper adjusted to a larger gripping width, FIG. 9 shows on a reduced scale a diagram for the use of the device shown in FIG. 1, the carriage being omitted for the sake of clarity, FIGS. 10 and 11 are a side- and a front view respectively of the device shown in FIG. 1, the carriage being included, FIG. 12 is an enlarged sectional view taken on the line XII—XII in FIG. 11, FIG. 13 is an enlarged sectional view taken on the line XIII—XIII in FIG. 12, FIG. 14 is a variant corresponding to FIG. 13, and FIG. 15 shows on an enlarged scale the detail XV of FIG. 12.

The pipe bundle key 1 embodying the invention comprises a main frame 2 formed essentially by a longitudinal rail 4 extending in the direction of pull 3 of the bundle key 1 for guiding a gripper 5 and two transverse rails 6, welded to the upper portion of said longitudinal rail 4 for guiding two subframes 7. Each subframe 7 comprises two suspenders 8, which are displaceable by means of rollers 13 in the direction 9 transverse of the pulling direction 3 with respect to the main frame 2 and to which a platform 11 is pivotally suspended by means of hinges 10.

The gripper 5 comprises a gripper carrier 15 suspended by means of rollers 14 to the main frame 2 and having two wings 19 extending in a transverse direction, a gripper frame 16 rotatably journalled by means of a horizontal stub shaft 17 in a bearing 18 of the gripper carrier 15, two arms 20 pivoted to the gripper frame 16 by means of vertical hinges 21 and a clamp 22 pivoted to the arms 20 by means of vertical hinges 100 and having two clamping jaws 25 adapted to engage the outer circumference of a front flange 23 of a bundle of pipes 24.

The clamp 22 comprises two levers 26 suspended by plates 27 to the arms 20 and having the clamping jaws 25 at the front ends and supports 28 in close proximity thereof. The front ends and supports 28 in close proximity thereof. The levers 26 are pivotally journalled in the supports 28 and are actuated by a strong hydraulic screw jack 29. The arm $a$ between the clamping jaw 25 and the support 28 is materially shorter than the arm $b$ between the support 28 and the screw jack 29.

The supports 28 are interconnected by means of a pulling rod 30 of adjustable length in order to adapt the clamp 22 to various diameters $c$ of the front flanges 23 of pipe bundles 24. The large diameter variations are compensated for stepwise by means of one or more coupling pieces 31, each coupled at both ends with the pulling rod 30 by means of a coupling 32. Each coupling 32 comprises a sleeve 33 divided in the longitudinal direction into halves and surrounding the flanges 34 to be coupled with one another and a sleeve 35 slipped onto the former and secured against an axial displacement with the aid of a circlip 36. The smaller diameter variations are compensated for by means of a screw rod 37, which can be screwed to a greater or lesser extent into a screwthreaded sleeve 38. The clamp 22 is adjustable between a minimum gripping width $d$ (FIG. 7) and a maximum gripping width $e$ (FIG. 8).

The stub shaft 17 of the gripper frame is coupled with a screw jack drive 39, which can be actuated by a handwheel 40 for swinging the gripper frame 16 and the clamp 22 about the axial line 101, which is in line with the axis of symmetry of the pipe bundle 24 in the pulling direction 3.

Owing to this rotatability the clamp 22 can be moved into a position in which the clamp jaws 25 can readily engage the front flange 23 of the pipe bundle 24 and, if necessary, when dislodging the pipe bundle 24 a torsional torque may be exerted by means of the handwheel 40 on the front flange 23.

The pulling means of the pipe bundle key 1 embodying the invention comprise two reaction legs 42 adapted to engage a jacket 41 of the pipe bundle 24. Each reaction leg 42 has secured to it a foot 43 adapted to turn about a pivotal shaft 44 and to be readily fastened to a flange 46 of the jacket 41 by means of a bolt 45, which is passed through a hole 47 of the flange 46. In the flange 46 holes for receiving bolts 47 are provided for fastening a cover 48 to the jacket 41, which cover is removed prior to the withdrawal of the pipe bundle from the jacket 41. Each reaction leg 42 is displaceable in the pulling direction 3 and journalled in the two suspenders 8 of a subframe 9 on rollers 49. Each reaction leg 42 has two series of stop cams 50 and 51 and extends through coupling means 52 fastened to a wing 19, with the reaction leg can be coupled with the gripper 5. Said coupling means 52 comprises a coupling pawl 54 adapted to turn about a shaft 53 and to be set by means of the handle 55 in the position 55a indicated in FIG. 5 by broken lines, in which position the coupling pawl 54 co-operates with a cam 50 during the withdrawal of the pipe bundle 24 from the jacket 41 or in a position 55b indicated by dotted lines, in which the coupling pawl 54 co-operates with a cam 51 during the re-introduction of a bundle 24 into the jacket 41. The coupling means 52 can be discoupled because in the intermediate position 55c of the lever 102 the cams 50 and 51 can freely slide beneath the coupling pawl 54.

Each wing 19 has a slot 56 extending in the transverse direction 9 for passing a reaction leg 42. Since the reaction legs 42 together with the suspenders 8, in accordance with the diameter of the flange 46 of the jacket 41, are set in a given position shifted in the transverse direction 9, each coupling pawl 54 extends in the transverse direction 9 in order to be capable of co-operating in any position of the suspenders 8 with the cams 50 or 51. The pulling means of the pipe bundle key are formed by strong hydraulic screw jacks 57, which are incorporated near the feet 43 in the reaction legs 42.

A plurality of auxiliary carriers 58 for holding the pipe bundle 24 are displaceable in the pulling direction 3 and fastened to the main frame 2, the auxiliary carriers 58 being adapted by rollers 59 to roll along the longitudinal rail 4 on the side of the gripper 5 facing the jacket. Each auxiliary carrier 58 comprises a flexible belt 61 adapted to grip around an intermediate flange 60 of the pipe bundle 24 as soon as the latter emerges from the jacket 41. For this purpose each belt 61 is suspended to the auxiliary carrier 58 at one end directly and at the other end by means of a hydraulic screw jack (not shown) so as to be variable in length. By using these auxiliary carriers 58 the pipe bundle 24 is adequately supported during the whole operation of the withdrawal and the re-insertion out of and into the jacket 41 so that inadmissible, permanent deformations produced by sagging of the pipe bundle 24 are avoided.

During the use of the bundle key 1 the main frame 2 is held by a carriage 68. It will be apparent that during the withdrawal of a pipe bundle 24 the reactive pressure forces exerted by the reaction legs 42 on the flange 46 of the jacket 41 are directed in opposite senses and are in common equal to the pulling force exerted by the gripper 5 on the pipe bundle 24 so that when employing the pipe bundle key 1 in accordance with the invention the frame 64 holding the heat exchangers 65 is not subjected to additional tensile or compression forces so that deformation of the frame 64 and/or tearing the frame 64 from its foundation 66 are avoided.

The main frame 2 is suspended to a rolling frame 67, which is adapted to travel by means of wheels 73 along longitudinal rails 74 of the chassis 75 of the carriage 68 (see FIGS. 10 to 15). The rolling frame 67 comprises two transverse rails 69 supporting each two tackles 71 suspended thereto by means of rollers 70, the hooks 72 of which engage the transverse rails 6 of the main frame 2.

The carriage 68 comprises telescopic legs 76 preferably consisting of four telescopic tubes 81, 83, 91 and 93 formed by square-section cylinders and relatively guided by means of guide sleeves 63. The top ends of the telescopic tubes 83, 91 and 93 are secured to a nut 85, 88 and 92 respectively. Screw-threaded shafts 79 of the legs 76 are driven in common by a hydraulic motor 77 and a driving gear 78 from a hydraulic pump (not shown). The upper collar 80 of the screw-threaded shaft 79 holds the telescopic tube 81. The screw-threaded shaft 79 is screwed into the nut 85. The screw-threaded shaft 79 is surrounded by a screw-threaded sleeve 86, which is screwed into the nut 88. Likewise the screw-threaded sleeve 86 is surrounded by a screw-threaded sleeve 90, which is screwed into the nut 92. The screw-threaded shaft 79 and the screw-threaded sleeves 86 and 90 are secured against relative turns by means of wedges 87 and 89.

It will be appreciated from FIG. 14 that the telescopic tubes 81, 83, 91 and 93 may have a circular section and may be secured against relative rotations by means of wedges 82. The wedges 82 are welded to the inner sides of the telescopic tubes 81, 83 and 91. To the outer sides of the telescopic tubes 93, 91 and 83 are welded substantially semi-cylindrical dishes 84, which abut against the wedges 82.

A foot plate 96 of each leg bears on a set of caster wheels 97. Prior to the use of the pipe bundle key 1 each leg 76 is fixed to a screw jack 98.

The operation of the pipe bundle key 1 in accordance with the invention is as follows.

When the pipe bundle 24 of the lowermost heat exchanger 65 shown in FIG. 10 has to be cleaned, the carriage 68 is moved approximately to right in front of said heat exchanger 65, the legs 76 are fixed with screw jacks 98 and the gripper 5 is moved to the level of said heat exchanger 65 by adjusting the length of the telescopic legs 76. The cover 48 is removed from the heat exchanger 65, whilst standing on the platforms 11, if required.

During the said and further operations the rolling frame 67 is moved as far as required towards the heat exchanger 65, which is allowed by the length $f$ of the rolling frame 67, which is smaller than the length $g$ of the longitudinal rails 74, the longitudinal rail 4 extending over a length $h$ beyond the carriage 68. This has the advantage that adjacent heat exchangers 65 with covers 48 will not intervene either with the disposition of the carriage 68 or the operation of the gripper 5 and the reaction legs 42. If necessary, the position of the gripper 5 is more accurately adjusted coaxially to the pipe bundle 24 by displacing the tackles 71 in a transverse direction and/or by actuating them for varying the level and/or the direction of the pipe bundle key 1. The clamp 22 is clamped tight to the front flange 23 of the pipe bundle 24 after the pulling rod 30 has been adapted to the diameter of the front flange 23. The reaction legs 42 are fastened to the flange 46 of the jacket 41, for which purpose, if necessary, the suspenders 8 are displaced in a transverse direction. The gripper 5 is coupled by means of the cams 50 and the coupling pawl 54 with the reaction legs 42 and the screw jacks 57 are energized, whilst, as the case may be, a torsional torque is exerted on the gripper 5 by means of the tackles 71 and/or the handwheel 40. When the pipe bundle 24 gets loose and emerges from the jacket 41 by the extension of the screw jacket 57, the gripper 5 moves in the pulling direction 3 along the longitudinal rail 4, until the two screw jacks 57 have reached the ends of their strokes. Then the screw jacks 57 are drawn in after discoupling of the coupling pawls 54. After coupling of the coupling pawls 54 with cams 50 located further to the rear, the next pull is carried out.

As soon as an intermediate flange 60 emerges from the jacket 41 it is suspended to an auxiliary carrier 58. When the pipe bundle 24 is withdrawn completely out of the jacket 41, the reaction legs 42 are disconnected from the flange 46, the rolling frame 67 is displaced as far as possible in the pulling direction 3 and the pipe bundle key 1 is lowered until the pipe bundle 24 bears on a cleaning waggon 99 previously driven to beneath the same. The clamp 22 and the auxiliary carriers 58 are then disengaged from the pipe bundle 24 and if necessary the pipe bundle 24 is conveyed to a cleaning station.

When the pipe bundle 24 is re-inserted into the jacket 41, the pipe bundle 24 lying on the cleaning waggon 99 is gripped by the clamp 22 at the front flange 23 and suspended to the auxiliary carriers 58 and the gripper 5. The pipe bundle 24 is disposed coaxially to the jacket 41 by elevating and positioning the pipe bundle key 1. The reaction legs 42 are fastened to the flange 46 and the pipe bundle 24 is pressed into the jacket 41, the reaction legs 42 then serving as pulling legs, whilst the coupling pawls 54 co-operate with cams 51. In order to move the pipe bundle 24 into the required angular position, the gripper frame 16 is turned by means of the handwheel 40 over the required angle. As a matter of course, the auxiliary carriers 58 are removed from the intermediate flanges 60 just before each intermediate flange 60 disappears in the jacket 41. After the pipe bundle 24 has been located at its place in the jacket 41, the gripper 5 and the reaction legs 42 are disconnected from the heat exchanger 65 and removed, the heat exchanger 65 being again closed by the cover 48. Finally the screw jacks 98 are screwed down and the carriage 68 with the pipe bundle key 1 is removed.

In order to give an idea of the proportions of a pipe bundle key 1 according to the invention the following example may be useful.

The pipe bundle key embodying the invention is specifically suitable for handling pipe bundles 24 of a weight of 5000 to 25,000 kgs. The two screw jacks 57 have a common tractive or compression force of, for example, 10,000 kgs. The pipe bundles 24 to be handled may have a length of, for example, 8 ms or less, in which case the length of the carriage is 9.2 ms. The maximum working height of the pipe bundle key 1 may be 4 to 10 ms. The clamp is adjustable between 0.8 and 2 ms.

The pipe bundle key 1 in accordance with the invention has the advantage that a pipe bundle 24 can be removed without the need for removing the covers 48 of adjacent heat exchangers 65.

What is claimed is:

1. A pipe bundle key comprising a gripper adapted to engage a bundle of pipes and pulling means adapted to be coupled with the gripper and to be moved in the pulling direction of the pipe bundle, the gripper being arranged on a main frame which is suspended from a carriage provided with telescopic carrier legs, said pulling means comprising at least two reaction legs adapted to engage a jacket of a bundle of pipes and each reaction leg being displaceably arranged in a subframe in the pulling direction and having at least one series of stop cams coupled with the gripper by means of coupling means engaging the stop cams and adapted to be discoupled, each subframe being arranged on the main frame so as to be displaceable in a direction transverse of the pulling direction and for each reaction leg the gripper being provided with a wing extending in said transverse direction.

2. A pipe bundle key as claimed in claim 1, characterized in that the main frame essentially comprises a longitudinal rail for the gripper extending in the pulling direction and at least two transverse rails welded to the top portion of the longitudinal rail for the subframes.

3. A pipe bundle key as claimed in claim 1, characterized but at least one platform suspended to the subframe.

4. A pipe bundle key comprising, in combination:
   a main frame adapted to be aligned with a bundle of pipes;
   gripper means for gripping the pipe bundle and carried by said main frame for relative movement along a predetermined path, and pulling means connected between said main frame and said gripper means for pulling said gripper means and the pipe bundle along said predetermined path; and
   a carriage having telescopic support legs whereby to adjust the height of said carriage, and support means suspending said main frame from said carriage for movement relative thereto in a direction transverse to said predetermined path whereby to dispose said main frame in said alignment with the pipe bundle.

5. A pipe bundle key as claimed in claim 4 characterized in that each telescopic carriage leg includes at least two coaxial screw-threaded sleeves.

6. A pipe bundle key as claimed in claim 4 characterized in that the pulling means includes at least two reaction legs adapted to engage a jacket of the bundle of pipes.

7. A pipe bundle key as claimed in claim 6, characterized in that the pulling means has screw jackets incorporated in the reaction legs.

8. A pipe bundle key as claimed in claim 6, characterized in that each reaction leg is provided with a foot pivotally fastened thereto.

9. A pipe bundle key as defined in claim 6 wherein said main frame includes a pair of transverse subframes, and means suspending said reaction legs from said subframes.

10. A pipe bundle key as defined in claim 9 including stop means for selectively coupling said reaction legs to said gripper means to impart movement to said gripper means along said predetermined path.

11. A pipe bundle key as defined in claim 10 wherein said stop means has two operable positions, one in which the reaction legs impart movement to said gripper means in one direction along said path and the other in which the reaction legs impart movement to the gripper means in the opposite direction along said path.

12. A pipe bundle key as claimed in claim 9, characterized in that each subframe is arranged on the main frame so as to be displaceable in a direction transverse of the pulling direction and in that for each reaction leg the gripper means is provided with a wing extending in said transverse direction.

13. A pipe bundle key as claimed in claim 9, characterized in that the main frame essentially comprises a longitudinal rail for the gripper extending in the pulling direction and at least two transverse rails welded to the top portion of the longitudinal rail for the subframes.

14. A pipe bundle key as claimed in claim 9, characterized by at least one worker supporting platform suspended from one of said subframes.

15. A pipe bundle key as claimed in claim 4, characterized in that a plurality of auxiliary carriers are provided for supporting the bundle of pipes so as to be displaceable in the pulling direction on the main frame.

16. A pipe bundle key as claimed in claim 4, characterized in that the gripper means comprises a clamp having at least two clamping jaws adapted to engage the outer circumference of the front flange of the pipe bundle.

17. A pipe bundle key as claimed in claim 4, characterized in that the main frame is suspended from the carriage by means of tackles adapted to move in the pulling direction and in a direction transverse thereof.

18. A pipe bundle key comprising, in combination:
a carriage adapted to be moved from place-to-place;
a main frame suspended from said carriage for movements relative thereto in a horizontal longitudinal direction and in a transverse directon;
pipe bundle gripper means movably carried by said main frame to move in said longitudinal direction;
a transverse subframe attached to said main frame;
suspender means carried by said subframe for positioning movements back and forth in said transverse direction;
a pair of extensible/retractible reaction legs carried by said suspender means for alignment with a frame carrying a pipe bundle;
said gripper means including transverse wings receiving said reaction legs; and
stop means for selectively coupling said reaction legs to said wings.

19. A pipe bundle key as defined in claim 18 wherein said gripper means includes a gripper assembly rotatable about said longitudinal direction relative to said wings.

20. A pipe bundle key as defined in claim 18 including tackle means suspending said main frame from said carriage for movements of said main frame in said longitudinal and transverse directions.

21. A pipe bundle key as defined in claim 20 wherein said carriage includes telescopic support legs.

* * * * *